United States Patent [19]

Detinko et al.

[11] 4,217,510

[45] Aug. 12, 1980

[54] VIBRATION DAMPING STATOR STRUCTURE FOR A HYDROGENERATOR

[76] Inventors: Felix M. Detinko, prospekt M. Toreza, 104, korpus 3, kv. 23; Alexandr A. Dukshtau, ulitsa Basseinaya, 111, korpus 3, kv. 34; Grigory B. Pinsky, ulitsa Varshavskaya, 41, korpus 2, kv. 68, all of Leningrad, U.S.S.R.

[21] Appl. No.: 903,791

[22] Filed: May 8, 1978

[51] Int. Cl.² ............................................. H02K 5/24
[52] U.S. Cl. ..................................... 310/51; 310/216; 310/258
[58] Field of Search ................. 310/51, 258, 259, 216, 310/217

[56] References Cited

U.S. PATENT DOCUMENTS

| | | | |
|---|---|---|---|
| 1,581,876 | 4/1926 | Samson | 310/259 UX |
| 2,078,668 | 4/1937 | Kilgore | 310/258 |
| 2,424,299 | 7/1947 | Baudry et al. | 310/51 UX |
| 3,278,773 | 10/1966 | Mikina | 310/51 |
| 3,462,624 | 8/1969 | Darrieus | 310/51 |
| 3,531,667 | 9/1970 | Barton et al. | 310/51 |
| 3,571,635 | 3/1971 | Turner | 310/258 X |
| 4,012,653 | 3/1977 | Shigeta et al. | 310/51 X |

Primary Examiner—Mark O. Budd
Attorney, Agent, or Firm—Fleit & Jacobson

[57] ABSTRACT

A hydrogenerator comprises a rotor with poles and a stator formed as a ring consisting of separate sectors secured to each other, the angle of every stator sector being of such a value that the product of that value and the number of rotor pole pairs is a multiple of $\pi$.

2 Claims, 2 Drawing Figures

VIBRATION DAMPING STATOR STRUCTURE FOR A HYDROGENERATOR

FIELD OF THE INVENTION

The present invention relates to electric machines, and more particularly to hydrogenerators, and is directed to improve a hydrogenerator sectional stator construction.

BACKGROUND OF THE INVENTION

Modern powerful hydrogenerators have a housing diameter about 20 meters and a stator core length up to 2.5 meters. An overall height of such hydrogenerators is as great as 13 meters and their weight often exceeds 1,500 tons. Obviously, when designing such machines, it should be considered that they are transported by railway or, if possible, by other kinds of transport. Therefore, not only the whole of a hydrogenerator but also its main components are manufactured detachable, sizes and weights of separate parts being confined to limiting railway gabarits and transport carrying capacity.

A hydrogenerator known to the prior art (cf. the book "Hydrogenerator Design and Construction" by A. I. Abramov et al., "Higher School" Publishing House, Moscow, 1964, p.13) comprises a stator of an annular form and a rotor, a hydrogenerator stator including a housing, a core, and a winding laid in core slots, is divided, according to its size, into two, four, or six equal (i.e. having equal angles) sectors secured to each other along their radial abutting planes. The spacers formed of a sheet of electroinsulating material are positioned between the abutting planes in the region of the core to fill the clearances. The number of these sectors is determined by possibilities of their transportation.

When a hydrogenerator is in operation, the stator core sectors are acted upon by a tangentially directed alternating electromagnetic force, its frequency being equal to n.p/60 (Hz), where n is a rotor rotational speed in revolutions per minute. That force causes stator core sectors to vibrate, and therefore to decrease this vibration the sectors should be secured to each other rigidly and tightly.

However, a hydrogenerator being in operation, tightness of abutment of stator sectors in the core region loosens influenced by a cyclic temperature rise and that results in the increase in sector vibrations and sometimes affects joints securing the core to the stator housing of a hydrogenerator. Tightening of the joints is a labor consuming operation and it fails to ensure a long-life preservation of tightness of stator abutment. The above mentioned vibrations of the stator sectors decrease the hydrogenerator reliability.

SUMMARY OF THE INVENTION

It is an object of the present invention to increase a hydrogenerator reliability by eliminating tangentially directed vibrations of a sectional stator core.

With this and other objects in view, there is proposed a hydrogenerator comprising a rotor with poles and a stator formed as a ring consisting of separate sectors secured to each other, wherein, according to the invention, the angle of every stator sector has such a value that the product of that value and the number of pole pairs is a multiple of $\pi$.

The advantage of the invention resides in the fact that for so chosen angle values of stator sectors radial abutting planes of every sector are located in the core portions where flux density is of equal value, and tangential electromagnetic forces acting in abutting planes of every sector and determined by the magnitude of flux density in these planes become equal and are mutually eliminated as it will be shown below in the description of hydrogenerator operation. That eliminates stator sector vibrations and increases the operational reliability of the hydrogenerator.

At least two stator sectors may have angles of different values. That is obtained when the hydrogenerator rotor has such a number of pole pairs that the product of that number and the value of sector angles can not be a multiple of provided that the sectors are equal and they are few in number.

These and other objects and advantages of the invention will become more apparent upon consideration of the following detailed description of its embodiment taken in conjunction with the accompanying drawings, wherein:

DETAILED DESCRIPTION OF THE INVENTION

Figure 1:
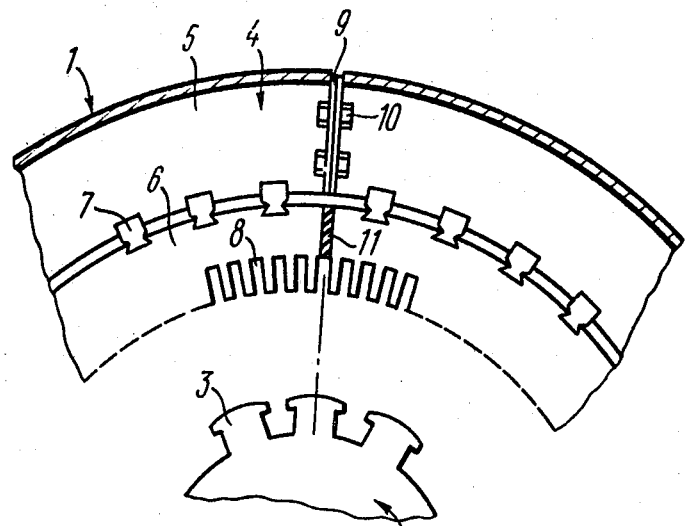
FIG. 1 shows a cross sectional view of a hydrogenerator, according to the invention.

A hydrogenerator, according to the invention, (FIG. 1) comprises a stator I and a rotor 2 having poles 3. The stator I is formed as a ring consisting of separate sectors 4, each comprising a part of a housing 5, a part of a core 6 secured to the housing 5 by wedges 7, and a part of a winding (not shown) laid within slots 8 of the core 6. The sectors 4 are secured to each other along radial abutting planes 9 by means of joints 10. Between the sectors 4 in the region of the core 6 spacers II of electroinsulating material are positioned.

The value of the angle $\beta$ formed between abutting planes 9 and 12 (FIG. 2) of every sector 4 depends on the number of pairs of the poles 3 (FIG. 1) of the rotor 2 and is chosen so that the product of the number p of pairs of the poles 3 of the rotor 2 and the value of the angle $\beta$ of the sector 4 is a multiple of $\pi$, i.e. it is defined by the ratio $p\beta = n\pi$, where n is a whole number.

The elimination of tangentially directed vibrations of the sectors 4 of the stator I of the hydrogenerator under consideration is explained by the following.

Figure 2:
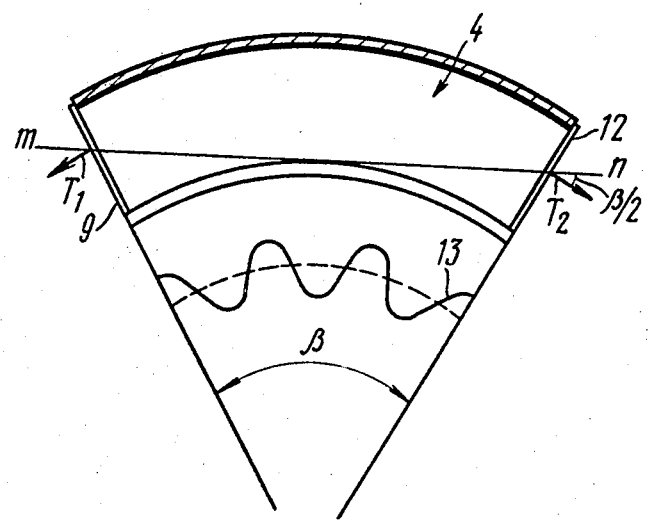
FIG. 2 shows schematically a stator sector of the hydrogenerator of FIG. 1 and a flux density distribution in the core of the stator sector.

In operation, the core 6 of the stator I is crossed by a magnetic flux caused by the poles 3 of the rotor 2. Therewith the flux density of the core 6 of the stator I is distributed along a sinusoidal curve 13 (FIG. 2) closed around a ring of the stator I (FIG. 1). At the abutting plane 9 (FIG. 2) the sector 4 is acted upon by a tangentially directed force $T_I$, equal to $$T_I = \left(\frac{B}{5000}\right)^2 F \cos^2 p\omega t \qquad \text{(kg f)}$$

where:
B is the average flux density in the back of the core 6 (FIG. I) of the stator I, gauss
F is the sectional area of the back of the core 6, sq cm
p is the number of pairs of poles 3 of the rotor 2

$\omega$ is the angular velocity of the rotor 2, sec$^{-1}$

At the adjacent abutting plane 12 (FIG. 2) spaced from the abutting plane 9 by the angle $\beta$ the sector 4 is acted upon by a force $T_2$ equal to $$T_2 = \left(\frac{B}{5000}\right)^2 F \cos^2 p\, (\omega t + \beta)$$

The difference of projections of these forces $T_1$ and $T_2$ onto the line mn normal to the bisectrix of the angle $\beta$ is equal to $$T = T_1 \cos\frac{\beta}{2} - T_2 \cos\frac{\beta}{2} = \left(\frac{B}{5000}\right)^2 F \cos\frac{\beta}{2} \sin p\beta \sin(p\beta + 2\omega t) \quad (I)$$

Since the value of the angle $\beta$ is defined by the ratio $p\beta = n\pi$ the factor $\sin p\beta$ included into the formula (I) becomes equal to zero, that is the projections of alternating electromagnetic forces acting upon the sector 4 at the abutting planes 9 and 12 become equal in their value and are mutually balanced.

It should be understood that, according to the invention, the sectors 4 of the stator I (FIG. I) can be made similar, i.e. with equal values of the angle $\beta$, or dissimilar, i.e. two sectors 4 or more may have different values of the angle $\beta$. For example, if the rotor 2 has ten pairs of poles 3 the stator I may be divided into four equal sectors 4 with angles $\beta = \pi/2$ and thereby $p\beta = 10\pi/2 = 5\pi$ which is a multiple of $\pi$. However, it is possible that the rotor 2 has such a number of pairs of poles 3 that the ratio $p\beta/\pi$ can not be a whole number if all sectors 4 are similar and they are few in number. It that case the sectors 4 should be made dissimilar but the angle $\beta$ of every sector should have such a value that the ratio $p\beta/\pi$ will be a whole number.

For example, assume that the number p of pairs of poles 3 of the rotor 2 is equal to 17 and according to conditions of transportation it is not sufficient to divide the stator I into two sectors. When the stator I is divided into three equal sectors the angle $\beta = 2\pi/3$, the product $p\beta = 17 \times 2\pi/3$, and $\sin p\beta = -0.87$. According to the formula (I) the force T in that case is not equal to zero and will cause the vibration of the core 6. Dividing the stator I into three dissimilar sectors 4 two of which have the angle $\beta_1 = (11\pi)/17$ and the third one has the angle $\beta_2 = (12\pi)/17$ we obtain $\sin p\beta_1 = \sin p\beta_2 = 0$, that is to say, the tangential forces in abutting planes of every sector 4 of the stator 6 will be mutually balanced and will not cause any vibrations even with clearances at the abutting planes 9.

The present invention provides the elimination of vibrations in a sectional stator of a hydrogenerator without an increase in elaboration and duration of Hydrogenerator design and manufacturing processes. The reliability of a hydrogenerator is increased without the necessity of retightening stator sector joints during operation.

What is claimed is:

1. A hydrogenerator comprising: a rotor having a plurality of pole pairs; a stator formed as a ring consisting of a plurality of separate arcuately shaped sectors secured to each other, said sectors being formed as individual separate segments; and means for fastening said separated segments one to another to form said ring, the angle subtended by the arc of each arcuately shaped sector being of such a value that the product of said value and the number of pole pairs of said plurality of poles of said rotor is an integral multiple of $\pi$, whereby upon fastening said separate segments together tangential electromagnetic forces acting in abutting planes of every sector segment will be cancelled and stator sector vibrations eliminated.

2. A hydrogenerator comprising a rotor having a plurality of pole pairs, and a stator formed as a ring consisting of a plurality of separate arcuately shaped sectors secured to each other, the angle subtended by the arc of each arcuately shaped sector being of such a value that the product of said value and the number of pole pairs of said plurality of poles of said rotor is a multiple of $\pi$, wherein at least two of said plurality of arcuately shaped sectors of said stator can have angles which are different than the angles of the remaining number of said plurality of sectors, and wherein said remaining number of sectors have identical angles, whereby tangential electromagnetic forces acting in abutting planes of every sector will be cancelled and stator vibrations eliminated.

* * * * *